United States Patent [19]  
Tacke et al.

[11] Patent Number: 4,923,957  
[45] Date of Patent: May 8, 1990

[54] PROCESS FOR THE PRODUCTION OF AROMATIC POLYESTERS

[76] Inventors: Peter Tacke; Ulrich Grigo; Karsten-Josef Idel, all of Bayer Aktiengesellschaft, D 4150 Krefield-Uerdingen, P.O. Box 166, Fed. Rep. of Germany

[21] Appl. No.: 292,917

[22] Filed: Jan. 3, 1989

[30] Foreign Application Priority Data

Jan. 13, 1988 [DE] Fed. Rep. of Germany ....... 3800671

[51] Int. Cl.$^5$ ..................... C08G 63/00; C08G 67/00; C08G 69/00
[52] U.S. Cl. .................................. 528/271; 528/176; 528/194; 525/437; 525/448
[58] Field of Search ................ 525/437, 448; 528/176, 528/194, 271

[56] References Cited

U.S. PATENT DOCUMENTS 4,127,560 11/1978 Kramer.  
4,330,668 5/1982 Hideo et al..

Primary Examiner—Harold D. Anderson  
Assistant Examiner—T. Mosley

[57] ABSTRACT

Aromatic polyesters based on diphenols and iso- and/or terephthalic acid are produced by transesterification of esters of the diphenols with the aromatic dicarboxylic acids in the melt by first reacting the aromatic dicarboxylic acids with a stoichiometric excess of the diphenol esters to form oligomers and then condensing the resulting oligomers to the aromatic polyesters with elimination and removal by distillation of diphenol ester.

5 Claims, No Drawings

PROCESS FOR THE PRODUCTION OF AROMATIC POLYESTERS

This invention relates to a process for the production of aromatic polyesters based on diphenols and iso- and-/or terephthalic acid by transesterification of esters of the diphenols with the aromatic dicarboxylic acids in the melt.

The production of polyarylates by transesterification in the melt by the acetate process where bisphenol diacetates are reacted with iso- and/or terephthalic acid is known. The reaction is seriously complicated by the tendency of the two aromatic dicarboxylic acids, particularly the terephthalic acid, towards sublimation. The sublimate is infusible and soon blocks the inlet and outlet pipes of the reactors. In addition, the molecular weights obtained are inadequate because one of the reaction components disappears from the reaction mixture in a quantity that is difficult to estimate.

To avoid or suppress sublimation, it has been proposed, cf. for example US-PS 2,948,856 and EP-OS 26 121, to use an inert, high-boiling solvent, for example diphenyl ether, in the transesterification reaction. Although a solvent such as this is extremely effective in suppressing sublimation, it has been found that the complete separation of this solvent from the polyesters is extremely involved and difficult.

A process for the production of aromatic polyesters based on diphenols and an aromatic dicarboxylic acid selected from isophthalic acid, terephthalic acid or mixtures thereof by transesterification of esters of the diphenols with the aromatic dicarboxylic acids in the melt has now been found and is characterized in that the aromatic dicarboxylic acid esters are first reacted with a stoichiometric excess of the diphenol ester to form oligomers which are then condensed to the aromatic polyesters with elimination and removal by distillation of diphenol ester.

In the process according to the invention, the stoichiometric excess of the diphenol esters initially used amounts to between about 1 and 100 mol-%, preferably to between about 10 and 70 mol-% and more preferably to between 20 and 60 mol-%.

Bisphenols used for the production of the aromatic polyesters are, for example, those described in DE-OS 29 40 024. Bisphenol A (BPA; 2,2-bis-4-hydroxyphenyl-propane) is preferably used. Monocarboxylic acids, such as acetic acid, propionic acid or benzoic acid, are suitable for the esterification of the bisphenols. Acetic acid is preferably used for the esterification of the bisphenols.

The bisphenol diacetates preferably used may also be prepared by reaction of the corresponding biphenols with acetanhydride, as described for example in EP-OSS 26 121, 26 684 and 28 030. The bisphenol diacetates may also be prepared in the presence of the aromatic dicarboxylic acids mentioned above.

The transesterification in the melt according to the invention is preferably carried out in the presence of catalysts which are added in quantities of up to 3% by weight, based on the diphenols used. Quantities of 0.001 to 1% by weight, based on the diphenols used, are preferred. The catalysts may be added before the beginning of or at any stage during the preparation of the esters. The catalysts may also be added to the reaction mixture after preparation of the esters.

Suitable catalysts for the transesterification in the melt are, for example, sodium hydroxide, potassium hydroxide, zinc acetate, magnesium acetate, tetraalkyl titanates, dialkyl stannates, tetraalkyl stannates, aryl stannates, mixed tin ester salts, phosphines and/or heat-stable tertiary amines, the tin compounds and magnesium acetate being preferred.

The process according to the invention is usually carried out at temperatures of about 180° to 360° C., preferably 200° to 320° C. The starting components are fist reacted to form oligomers at temperatures of about 180° to 260° C., preferably 200° to 220° C., under an inert gas atmosphere (e.g. nitrogen) under normal pressure and the oligomers are then condensed to form the aromatic polyesters at temperatures of about 250° to 360° C., preferably 270° to 320° C. in a stream of nitrogen or in vacuo (about 0.1 to 100 mbar).

Since the aromatic polyesters have high melt viscosities, they are difficult to produce in glass flasks or steel vessels equipped with stirrers. Accordingly, it is preferred to prepare only readily stirrable precondensates having relative solution viscosities of from about 1.06 to 1.18 (as measured on a solution of 0.5 g ester in 100 ml solution at 25° C. using $CH_2Cl_2$ or 1:1 mixtures of phenol and o-dichlorobenzene as solvent) in stirred reactors such as these. Further condensation may then be carried out, for example, in the melt in a vacuum extruder or, for very small quantities in the laboratory, in a glass flask equipped with a powerful stirrer. In addition, further condensation may be carried out in the solid phase. The aromatic polyesters obtained generally have solution viscosities of 1.2 to 2.0 and preferably from 1.23 to 1.7 (as measured in the solvents mentioned above).

The aromatic polyesters produced by the process according to the invention may be extruded in standard machines to form semi-finished products or injection-molded to form moldings. The aromatic polyesters may also be added to other polymers to improve their properties.

EXAMPLE 1

Preparation of a polyester of bisphenol A and pure isophthalic acid 51.3 g (0.225 mol) BPA, 50.53 g (0.495 mol) acetahydride and 50 mg di-n-butyltin dilaurate were introduced into a three-necked flask equipped with a stirrer and distillation bridge and heated under reflux for 30 minutes in a nitrogen atmosphere, the acetic acid formed distilling off. The excess acetanhydride was then distilled off at a sump temperature of 130° C./100 mbar.

24.92 g (0.15 mol) isophthalic acid were added to the BPA diacetate obtained in this way, followed by stirring at 200° C. under normal pressure in a nitrogen atmosphere. The temperature was then increased to 260° C. over a period of 3 hours during which the melt became clear. Acetic acid distilled over. Traces of colorless substance sublimed in the neck of the flask.

The BPA diacetate was then distilled at a sump temperature of 280° C./3 mbar, passing over as a colorless substance melting at 78° C. After 2 hours, distillation was terminated because the melt had become viscous and could no longer be moved by the glass stirrer used. There was no evidence of sublimation. After cooling, the produt (precondensate) was a yellow-brown, brittle substance having a relative solution viscosity $\eta_{rel}$ of 1.168 (as measured on a solution of 0.5 g substance in 100 ml solvent). A mixture of 50% by weight phenol and 50% by weight o-dichlorobenzene was used as the solvent.

20 g of the precondensate were condensed at 300° C./2 mbar in a glass flask equipped with a steel stirrer. The $\eta_{rel}$ value rose to 1.493. The polyester obtained was no longer brittle.

EXAMPLE 2

Preparation of a polyester of bisphenol A and a mixture of 70% terephthalic and 30% isophthalic acid After the preparation of BPA diacetate as described in Example 1, 24.92 g of a mixture of 70% terephthalic acid (17.44 g) and 30% isophthalic acid (7.48 g) were added. The reaction was carried out as described in Example 1. The precondensate had a $\eta_{rel}$ value of 1.159 and the final polyester a $\eta_{rel}$ value of 1.487.

COMPARISON EXAMPLE

The procedure was as described in Example 2, except that 34.24 g (0.15 mol) BPA were reacted with 33.7 g acetanhydride. The quantities of the acids used were the same as in Example 2. In this case, 2.47 g sublimate were found in the necks of the flask. The sublimate was infusible. The relative solution viscosity ($\eta_{rel}$) of the product did not exceed a value of 1.213. The product was particularly dark in color.

I claim:

1. A process for the production of aromatic polyesters based on diphenols and an aromatic dicarboxylic acid selected from isophthalic acid, terephthalic acid or mixtures thereof by transesterification of acetic acid, propionic acid or benzoic acid esters of diphenols with the aromatic dicarboxylic acids in the melt, characterised in that the aromatic dicarboxylic acids are first reacted with a stoichiometric excess of the diphenol ester to form oligomers which are then condensed to the aromatic polyesters with elimination and removal by distillation of diphenol ester.

2. A process as claimed in claim 1, wherein the diphenol ester is diphenol diacetate.

3. A process as claimed in claim 2, wherein the diphenol diacetate is bisphenol A diacetate.

4. A process as claimed in claim 1, wherein the stoichiometric excess of the diphenol ester initially used is between 1 and 100 mol-%.

5. A process as claimed in claim 1, wherein the stiochiometric excess of the diphenol ester initially used is between 20 and 60 mol-%.

* * * * *